United States Patent Office 3,666,626
Patented May 30, 1972

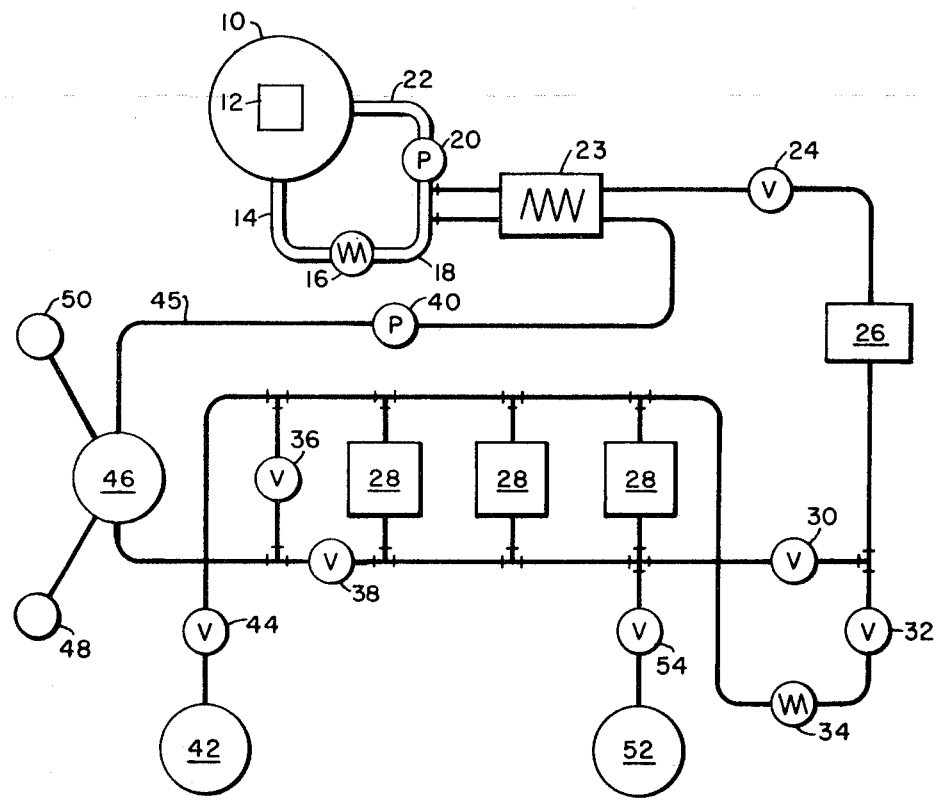

3,666,626
METHOD AND MEANS FOR REVERSIBLY CHANGING THE BORIC ACID CONCENTRATION IN THE COOLANT OF A NUCLEAR REACTOR
Gottfried Gramer, Furth, and Gunter Wittrowsky, Erlangen, Germany, assignors to Siemens Aktiengesellschaft, Berlin and Munich, Germany
Filed Jan. 17, 1969, Ser. No. 791,893
Claims priority, application Germany, Jan. 23, 1968,
S 113,825
Int. Cl. G21c 7/00
U.S. Cl. 176—86     7 Claims

ABSTRACT OF THE DISCLOSURE

A method and means whereby the boric acid concentration in the primary coolant of the nuclear reactor may be reversibly changed in order to compensate for excess reactivity and to enhance load follow capability. The primary coolant, or a portion thereof, may be passed through an anion exchange bed containing a basic resin. The temperature of the influent to the bed is varied such that the coolant receives additional boric acid at higher temperatures and loses boric acid at lower temperatures.

BACKGROND OF THE INVENTION

This invention relates to a system for reversibly changing the boric acid concentration in the primary coolant fluid of a nuclear reactor.

It has been found particularly advantageous in water cooled nuclear reactors to utilize boric acid in the primary coolant water to compensate for excess reactivity and to enhance load follow capability. Boron, and more particularly the isotope boron 10, has a relatively large neutron capture cross section in the thermal range and for that reason may be utilized to capture neutrons whenever an excess of neutrons are present for a particular operating level. It is important that the level of the boron concentration be adjusted in accordance with the operating conditions of a reactor. In general, whenever the load on a nuclear reactor is changed a corresponding change in the concentration of the boric acid must be made to properly trim the reactor.

At present changes in the boric acid concentration in the coolant fluid of a nuclear reactor are generally accomplished by drawing off a portion of the coolant and replacing that portion with an equivalent amount of coolant either of demineralized and deaerated water or of water blended with a higher concentration of boric acid. More particularly present systems automatically draw off a portion of coolant. This coolant is received by large tanks from evaporator which an evaporator concentrates the baric acid to a fixed amount or percentage by weight of boron. To lower the concentration of boric acid in the coolant, demineralized and deaerated water replaces this portion. To raise the concentration of boric acid, the concentrated boric acid which has been taken from the evaporator and stored is pumped into the reactor where it mixes with the main coolant stream to raise the coolant concentration.

Although the above outlined procedure operates well, in practice it requires that a large amount of water be processed to concentrate the boric acid solution therein. As can be seen, a rather complex and expensive sequence of evaporators, storage tanks, pumps, and valves were necessary to effectuate the above process, and a large amount of energy is connected therewith. As should be clear much of the equipment associated with the prior art process could be eliminated if the present method of concentration and storage of the diluted boric acid solution removed fromt he primary coolant stream could be eliminated.

SUMMARY OF THE INVENTION

The amount of equipment and energy utilized to change the boric acid concentration of the primary coolant water of a nuclear reactor is minimized in accordance with this invention through the use of an anion exchange bed containing basic anion resins, preferably a strongly basic resin, which operates to directly change the boric acid concentration in the primary coolant stream depending upon the temperature of influent to said bed.

The process of this invention may be delineated in that a temperature dependent resin bed directly changes the concentration of that portion of the primary coolant drawn off for this purpose. In contrast, the process of the prior art requires an indirect conversion in that the portion drawn off from the primary coolant is first separated into a boric acid concentrate and distilled water, then stored, and then remixed in a blender to the proper concentration. More particularly, a resin bed has the property of storing a concentrated boric acid solution within itself and releasing it in variable amounts depending upon the temperature of the influent to the bed. Viewed functionally, the resin bed therefore incorporates means for storing and means for controlling the release of boric acid concentrate which functions were performed by separate and expensive structures in the prior art.

In accordance with this invention, the enrichment or depletion of boric acid in the primary coolant water is accomplished by passing a portion of that coolant through an anion exchange resin bed charged with boric acid. The temperature and preferably the direction of the water flowing through the bed is varied such that boric acid enters the coolant at relatively higher temperatures and is stored in the resin bed from the coolant at relatively lower temperatures.

DESCRIPTION OF THE DRAWINGS

For a better understanding of the invention reference may be had to the accompanying drawing which shows a flow diagram of the system in accordance with this invention.

DESCRIPTION OF THE PREFERRED EMBODIMENTS

Referring to FIG. 1 there is shown a nuclear reactor 10 which for purposes of illustration shall be assumed to be of the pressurized water type which is controlled by a combination of movable control rods (the housing for which only is shown and designated by the numeral 12) and a chemical shim system. In general, the control rods are moved to compensate for short term reactivity changes at power such as might be produced by variations in the reactor power requirements or in the coolant temperature. The chemical shim or boron injection control system is used to compensate for more slowly occurring changes in reactivity throughout core life such as those due to fuel depletion and fission product buildup. Both of the above systems must of course be adjusted in changing from a higher load to a lower load or vice versa. Reactor 10 includes one or more closed loop coolant circulating systems which systems generally comprises an outlet conduit 14, a heat exchanger 16, a connecting conduit 18, a pump 20, and an inlet conduit 22.

A fluid control device 24 which may simply be an orifice or throttling valve may be connected to the connecting conduit 18 for purposes of drawing off predetermined amounts of water from the primary circulation system for chemical control purposes. The portion of water drawn off by device 24 is first passed through a regenerative heat exchanger 23 where it may be used to cool water exiting from the main loop and to heat water re-entering the loop. Fluid, in this example, water, which exits through the fluid control device 24 may again optionally have a temperature varied by a heat exchanger (not shown) and then converted to a mixed bed filter 26 of a well known construction and is there purified in a normal manner. The purified or the demineralized water then flows through the ion exchangers 28; either from the bottom to the top by way of a valve 30 or from the top to the bottom by way of a valve 32 and a heat exchanger 34. Thereafter the water is returned to the reactor through valves 36 or 38 and pump 40. The ion exchangers 28 may be connected in series or preferably in parallel, as illustrated. A storage container 42 is also connected to the ion exchangers 28 through a valve 44.

A chemical and volume control tank 46 is connected to the return line 45. Tank 46 is coupled to a tank 48 containing concentrated boric acid and a tank 50 containing make-up water (as is usual in the art). It is to be noted that line 45 conveys the water back to the main coolant loop, i.e., into the connecting conduit 18, by way of the aforementioned regenerative heat exchanger 23. A hot water storage tank 52 containing water at about 60° C. may optionally be connected to the exchangers 28 at their bottom side via valve 52.

Where boron in the form of boric acid is used as the material for capturing neutrons and thus aiding in control of the reactivity in the core of a reactor 10 basic anion exchanger resins may be used to advantage. Such a resin having a polystyrene base appears particularly effective. Examples of such resins are styrene di-vinyl benzene polymer of the amine group, or that resin now having the trade name Lewatit M–500. A baffle mesh (not shown) should be included above and below the resin bed so that the resins cannot enter into the piping system. The amount of resin necessary in the beds depends upon the size of the boron storage required and the flow rates to be used with this system. In choosing a resin it is important that it not be subject to degradation or disassociation within a temperature range which is effective in varying the storage capacity of the exchangers 28. For the styrene di-vinyl benzene polymer, the stored boric acid is released from the ion bed into the coolant (at a temperature of about 60°). The boric acid may be removed from the coolant and stored in the ion exchangers at a temperature of about 10° C.

The operation of the above described structure can be explained on the basic of various functions associated therewith which are performed during normal reactor operations:

If the concentration of boric acid in the primary coolant of the reactor is to be reduced and the boric acid stored in the ion exchanger 28, a portion of the coolant water should be conveyed through the ion exchanger 28 from top to bottom at a temperature of about 10° C. In order to accomplish this, the valves 32 and 38 are opened; the remaining valves being closed. The water may then pass through heat exchangers 16 and 23 where it may be cooled to for example 60°. From there it passes through the mixed bed filter 26 where it is purified and through the heat exchanger 34 where its temperature is lowered to the required 10° C. The fluid then passes through the resin beds 28 which because of their temperature dependency store boronic boric acid removed from the coolant fluid. The coolant fluid having had its boron concentration reduced then passes through valve 38 and via pump 40 to return to the heat exchanger 23 where it is warmed to the temperature required to re-enter the reactor and in turn cools water which will be drawn off by the fluid separation means 24.

If the boric acid concentration of the coolant is to be increased, that is, boric acid is to be removed from the storage resin beds 28, the valves 30 and 36 are opened; the remaining valves being closed. In this case after the fluid has been drawn off by means 24 it passes from the bottom to the top of the resin bed without being cooled from the temperature at which it left heat exchangers 16 and 23, namely, about 60° C. In passing through the resin bed from bottom to top at this temperature, boron is taken out of storage and increases the concentration thereof in the coolant. The coolant then exits via valve 36 and is returned to the heat exchanger 23.

If it is desired to purify the coolant fluid by means of mixed bed filter 26 without changing the boric acid concentration valves 30 and 38 are opened and the remaining valves are closed. As may be seen, when the valves are positioned as described, the fluid flows through the mixed bed filter 26 through valve 30 through valve 38 and via pump 40 back into the closed primary coolant circuit without entering the resin beds 28.

Periodically the resin exchange beds 28 must be recharged with boric acid due to the depletion of the boron isotope B10 in transformation to isotope B11 through neutron capture. For this purpose the beds 28 are first charged with boric acid from the primary coolant loop. That is, valves 32 and 28 are opened such that the coolant has its temperature reduced by the heat exchanger 34 and passes through the beds from top to bottom thus having the boric acid removed therefrom. Subsequently, after the valves 32 and 38 have been closed, valves 54 and 44 are open such that hot water at about 60° is taken from the storage tank 52 and passed through the resin exchanger beds 28 from bottom to top where the fluid then flows via 44 to tank 42. Thus, the depleted boric acid is first removed from the primary coolant loop and stored in resin beds 28 and then removed from resin bed 28 and conveyed to charging tank 42. Boric acid concentrate may then be conveyed from storage tank 48 to the chemical control tank 46 so as to recharge the system.

Tests, utilizing the styrene di-vinyl benzene polymer as the basic anion resin, indicate that .18 pound of boron per cubic foot of resin bed changes are feasible with temperature changes of 60° C. to 10° C. Thus, for a 100 p.p.m. step change, corresponding to an overnight load change, 300 cubic feet of resin are necessary; assuming a reactor coolant system volume of 1200 cubic feet. It should be noted that the .18 coefficient value depends on resin type, temperature range, and boron concentration range for a particular change.

While there has been shown and described what are considered to be the preferred embodiments of the invention, modifications will occur to those skilled in the art. Accordingly, it is not desired that the invention be limited to the specific arrangements and embodiments shown and described, but rather that the true scope of the invention be delineated in the appended claims.

We claim as our invention:
1. A nuclear reactor control system, which comprises:
   a nuclear reactor having a coolant fluid circulating therethrough;
   at least one ion exchanger flow-coupled with said nuclear reactor, said ion exchanger having basic anion exchanger resins therein capable of being charged with a material having the property of capturing neutrons, said ion exchanger being temperature dependent with respect to its storage capacity of said neutron capturing material; and
   at least one heat exchange means flow coupled to the ion exchangers for varying the temperature of the influent to said ion exchangers whereby the amount of neutron capturing material in the influent to the reactor may be varied.
2. The nuclear reactor control system of claim 1 wherein the basic anion exchanger resins have a polystyrene base.
3. The nuclear reactor of claim 1 wherein the basic anion exchanger resins include styrene di-vinyl benzene polymer.
4. The nuclear reactor of claim 3 wherein the polymer is of the amine group.

5. The nuclear reactor control system of claim 2 including a plurality of ion exchangers, said ion exchanger being connected in parallel.

6. The nuclear reactor of claim 4 wherein the neutron capture material is in the form of boric acid, and wherein resins have the property of storing boric acid at 10° C. and yielding the stored boric acid to the coolant throughput at 60° C.

7. The nuclear reactor of claim 1 wherein the ion exchangers are flow-coupled to the reactor such that the direction of flow therethrough may be varied.

References Cited

UNITED STATES PATENTS

| 3,365,367 | 1/1968 | Dolle | 176—22 |
| 3,378,450 | 4/1968 | Gramer et al. | 176—37 |

FOREIGN PATENTS

| 1,080,794 | 8/1967 | Great Britain | 176—86 L |

CARL D. QUARFORTH, Primary Examiner

H. E. BEHREND, Assistant Examiner